Dec. 25, 1962   W. R. PRATT ETAL   3,069,816
ABRASIVE CUT-OFF DISKS
Filed April 22, 1959

United States Patent Office 3,069,816
Patented Dec. 25, 1962

3,069,816
ABRASIVE CUT-OFF DISKS
Willard R. Pratt, Rochester, and Donald H. Benson, Spencerport, N.Y., assignors to Vanguard Abrasive Corporation, Leroy, N.Y., a corporation of New York
Filed Apr. 22, 1959, Ser. No. 808,195
1 Claim. (Cl. 51—206)

The present invention relates to abrasive cut-off disks and, more particularly, to such disks of the type formed by a strong, circular sheet metal drive disk having a plurality of circumferentally spaced arcuate cutting segments secured around its periphery. The arcuate cutting segments typically are composed of diamond dust or fragments used as an abrasive and held dispersed and embedded in a hard material preferably consisting of a mixture of tungsten carbide and a binder metal such as cobalt powder. The arcuate segments preferably are manufactured in a garphite hot pressing die which compresses a heated mixture of the various ingredients placed into the die in powder form. The hardened segments so prepared are then secured to the periphery of the metal drive disk or core by silver soldering or are brazed on, it being important that the joint be strong in order to lengthen the life of the disk.

In the use of such a cutting disk, as for instance in cutting concrete or other hard abrasive material, another factor in securing a good strong disk having a longer useful life is to minimize the effect of undercutting and underwearing. This relates to the wearing as the disk rotates on the periphery of the disk at the junction of its circular edge with the inner edge region of the diamond-bearing cutting segments. This wear is caused by the abrasive action of loose abrading particles on the rotating circular junction edge region of the metallic drive disk which sharpens and thins the drive disk at the critical circular junction periphery to which the cutting segments are brazed or soldered. This sharpening and thinning of the metallic junction periphery of the drive disk weakens the brazing or soldered junction to such an extent as to cause premature breaking off of the cutting segments from the drive disk.

An object of the invention is to provide a generally improved and more satisfactory abrasive cutting disk having a metallic drive core to which are secured at circumferentially spaced points a plurality of arcuate segments of a hardened abrasive material.

Another object is the provision of a new and improved cutting disk having a stronger bond between the cutting segments and the metallic drive core.

Yet another object is to provide a new and improved cutting segment so constructed as to enable a better bond between the inner edge of the segment and the periphery of the drive core to which it is to be attached, and also so constructed as to have a built-in resistance to underwearing and undercutting.

A further object is the provision of a new and improved arcuate cutting segment having embedded diamond abrading elements that has a superior bond to the core and which has a good resistance to underwearing and undercutting.

These and other desirable objects may be attained in the manner disclosed as an illustrative embodiment of the invention in the following description and in the accompanying drawings forming a part hereof, in which.

The same reference numerals throughout the several views indicate the same parts.

Figure 2:
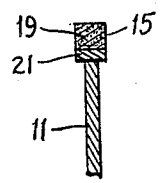
FIG. 2 is a fragmentary radial cross-section of the cutting disk of FIG. 1 taken approximately on the line 2—2 thereof.
Figure 1:
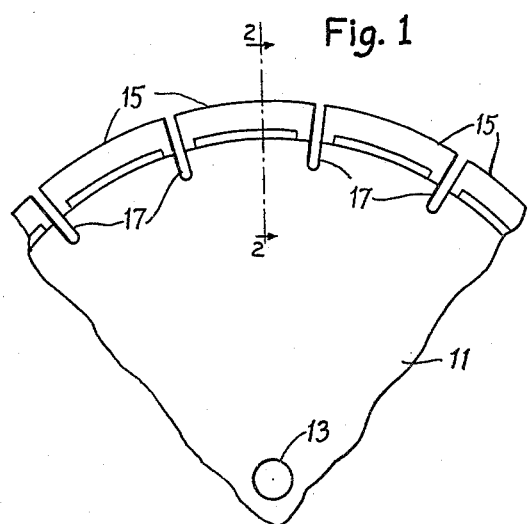
FIG. 1 is a fragmentary face view of a cutting disk to the periphery of which are attached arcuate cutting segments according to the invention.

In FIG. 1 is illustrated an abrasive cutting disk constructed in accordance with the invention. The cutting disk includes a central sheet metal drive disk or core 11 made of a suitable wrought metal, preferably steel, and provided with a central aperture 13 for mounting the disk on a rotating shaft. Secured around the periphery of the core 11 are a plurality of circumferentially spaced arcuate cutting elements 15 brazed or soldered to the outside edge of the core in a manner to be further explained. Desirably the outer edge portions of the core 11 are divided into a plurality of equal circumferential segments by a number of radially extending slots 17. As better seen in FIG. 2, the core 11 is a strong circular sheet metal disk having a lesser thickness than that of the arcuate segments 15 secured to the periphery thereof, which are approximately 1/16" to 3/16" in thickness.

Figure 3:
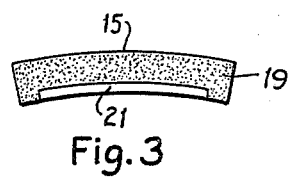
FIG. 3 is a side elevational view of the cutting segment shown in FIGS. 1 and 2 according to a first embodiment of the invention.

Each of the cutting segments 15 is rectangular in cross section and arcuate when viewed from the face as more particularly seen in FIG. 3. The inner radius of the base of each segment 15 is substantially the same as the outer radius of the core 11, the outer edge of the segment being approximately concentric with the inner radius. Each segment 15 comprises a main body section 19 composed of an abrading material such as diamond dust or fragments embedded in a hard material such as tungsten carbide bonded together with cobalt. As has been explained, the bases of the arcuate segments 15 are soldered or brazed onto the periphery of the core 11 between the slots 17. To facilitate the brazing operation, according to the invention, an underbody section of a material of a character more readily wet by the silver solder or brazing alloy preferably used is molded to the base of the diamond bearing body section 19. Thus, a relatively thin arcuate underbody section 21 forms the base of the cutting segment 15 and terminates inwardly of the ends of the segment so that the protruding ends of the body section are composed of the same material forming the other parts of the body section 19, namely, a mixture of diamond dust or fragments embedded in tungsten carbide bonded together with cobalt.

Figure 4:
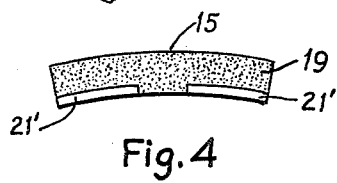
FIG. 4 is a view similar to FIG. 3 of another cutting element according to a second embodiment of the invention.

As shown in FIG. 4, the protruding portion of the diamond bearing abrasive material forming the body section 19 may protrude through the center of the base of the segment instead of at the ends. In this embodiment of the invention, a pair of spaced sections 21' of pure cobalt are provided at the base of the segment 15 between which the diamond bearing body material protrudes.

The purpose of the protrusion of the abrasive material to the base of the segments is to provide a built-in resistance to undercutting and underwearing. In the course of continued use of cutting disks of the type here described, difficulties have been encountered from the drive disk or core being worn out at the region of the circular junction edge to the base or inner edge region of the diamond containing cutting segments. This wear is caused by the abrasive action of loose abrading particles on the rotating circular junction edge region of the metallic drive disk which sharpens and thins the drive disk at the critical circular junction periphery to which the cutting segments are brazed. This sharpening and thinning of the metallic periphery of the drive disk weakens the brazing junction to such an extent as to cause premature breaking off of the cutting segments from the drive disk. In the present construction the tendency toward undercutting or underwearing is substantially eliminated by the wear resistant ends, in the FIG. 3 embodiment, and the wear resistant central region in the FIG. 4 embodiment.

The cutting segments 15 are conveniently made or manufactured in a graphite hot pressing die. Such a die which may be used is illustrated partly diagrammatically in FIG. 5, although it is to be understood that this die is for illustrative purposes only and the manufacture of cutting segments according to the present invention is not limited to this type of die. The die comprises a die structure formed of one or more generally rectangular die blocks 27 of graphite and defining a longitudinal die channel 29 in which are positioned two plug inserts 31 and 33 likewise of graphite. The lower die plug insert 33 is shown positioned in the lower portion of the channel 29 and is backed up by a backing block 35 which is also of graphite and held positioned against a metallic press member 37 by which the required pressure is applied to the die plug insert 33. The upper graphite plug insert 31 is movably positioned in the upper portion of the die channel 29 for movement under the pressure applied by a movable pressure plug 39 to which pressure is applied by the upper cooperating press member 41. The lower graphite plug insert 33 is provided with an upper arcuate die cavity surface 43 which corresponds to the outer curved arcuate surface of the cutting segment 15. The lower surface of the upper die plug insert 31 is similarly provided with a curved downwardly facing convex die cavity surface 45 which corresponds to the arcuate base of the cutting segment 15.

The two pressure members 37 and 41 are part of a conventional hot press and are designed to apply pressure to the opposite plug inserts 31 and 33 of the graphite die and also to provide electric conducting connections and send heating currents by way of the two graphite plug inserts through the die structure and heat the contents of the die cavity between the surfaces 43 and 45 to the desired temperature when performing the hot pressing operation.

Figure 5:
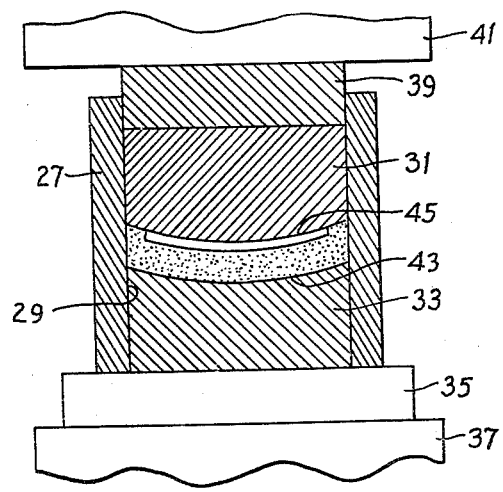
FIG. 5 is a cross-sectional view shown partly in diagrammatic form of a suitable graphite hot pressing die for constructing the cutting segment.

In producing cutting segments 15 of the invention by the hot pressing die of the type shown in FIG. 5, the upper press member 41 with the pressure plug 39 are lifted and removed from the die structure, and the upper plug insert 31 is likewise removed. Thereafter the mixture comprising the diamond bearing abrasive body section 19 of the cutting segment is deposited in powder form on the insert surface 43. Good results have been achieved by using a mixture of 0.122 gram of diamonds, 2.4 grams of 100 to 325 mesh tungsten carbide powder, and 3.6 grams of cobalt powder. Thereafter a quantity of pure cobalt is placed on top of the diamond bearing abrasive mixture. Good results have been achieved for the example given above by using 0.3 gram of cobalt powder. The cobalt powder is distributed to provide the wear resistant ends as shown in FIG. 3 or the wear resistant central section as shown in FIG. 4.

After replacing the upper plug insert 31 and the movable pressure plug 39, pressure is applied to the die members 37 and 41 while simultaneously heating the powder mixture to a high temperature to produce the hardened segment 15. A temperature of 2150 degrees Fahrenheit for the above example has been found to be satisfactory.

Alternatively, the pure cobalt metal layer or underbody sections 21 or 21' may be presintered under high temperature without pressure. For example, the cobalt powder may be presintered at a temperature of 1700 degrees Fahrenheit without pressure to produce a cake of powder of about the strength of chalk which may then be readily inserted in the graphite mold on top of the powder mixture of diamonds, tungsten, carbide, and cobalt. By making the presintering mold for the cobalt of a shorter length than the proposed segment length, it is possible to leave the desired protruding section of the abrading mixture at the ends (or at the center, if desired) of the segment.

The cutting segment 15 made in this manner is brazed to the steel core 11 at its peripheral edge between the radial slots 17. Conveniently the segments are silver soldered to the steel core 11. A test of the resistance to the rupture of this brazed joint showed a threefold increase in strength was accomplished. As has been explained, the under body or layer of pure cobalt 21 or 21' is more readily wet by the silver solder or brazing alloy. It has been found that the diamond content of the underbody or cobalt layer 21 or 21' is unimportant in effecting the bond between the core 11 and the segment 15, and in some cases it may be desirable to have the pure cobalt section contain diamonds but be free of the carbide.

A cutting segment 15 which has been found to be satisfactory has a depth or radial dimension of about ¼ inch, the depth of the underbody or cobalt layer 21 or 21' being about 1/32 inch. However, the layers 21 or 21' may be very much deeper, and in some cases for particular uses, this may be attractive and useful.

A cutting segment constructed in accordance with the invention, to summarize its advantages, bonds better to the core than other diamond segments of this type, and has a built-in resistance to undercutting and underwearing.

What is claimed is:

A cutting disk of the type including a steel core and a plurality of diamond-bearing abrasive segments secured to said core by solder or the like, each of said segments including an abrading body section comprising essentially a mixture of diamond material, tungsten carbide, and cobalt bonded together under influence of heat, characterized by the novel feature that each of said segments also includes an underbody section next to said core and extending through only a part of the length of the segment and composed essentially of pure cobalt, the essentially pure cobalt of the underbody section being capable of bonding strongly with the cobalt-containing abrading body section and also being capable of bonding with the solder or the like which secures the segment to the steel core to a substantially better extent than said solder or the like can bond directly with said abrading body section, the remainder of the length of each abrasive segment beyond said underbody being extended radially inwardly through the thickness of said underbody, to reduce undercutting of said underbody by loose abrading particles.

References Cited in the file of this patent

UNITED STATES PATENTS

| | | |
|---|---|---|
| 2,796,706 | Anderson | June 25, 1957 |
| 2,798,474 | Ballhausen | July 9, 1957 |
| 2,808,044 | Upper et al. | Oct. 1, 1957 |